United States Patent [19]

Yamakawa et al.

[11] Patent Number: 4,558,087

[45] Date of Patent: Dec. 10, 1985

[54] VINYL CHLORIDE RESIN COMPOSITION FOR PRODUCTION OF HARD ARTICLES

[75] Inventors: Masahiro Yamakawa; Mamoru Nakamura, both of Takaoka; Toyoichi Arai, Himi, all of Japan

[73] Assignee: Nippon Zeon Co. Ltd., Tokyo, Japan

[21] Appl. No.: 629,604

[22] Filed: Jul. 11, 1984

[30] Foreign Application Priority Data

Jul. 13, 1983 [JP] Japan ................................ 58-127104

[51] Int. Cl.$^4$ ........................ C08K 3/04; C08L 27/06
[52] U.S. Cl. .................................... 524/495; 252/511; 523/174; 524/496; 524/504; 524/521; 524/522; 524/524; 524/527; 524/559; 524/560; 524/563; 524/565; 524/567; 524/568
[58] Field of Search ............... 524/495, 496, 521, 522, 524/524, 527, 559, 560, 563, 565, 567, 568, 504; 252/511; 523/174

[56] References Cited

U.S. PATENT DOCUMENTS

| | | | |
|---|---|---|---|
| 4,280,941 | 7/1981 | Datta et al. | 252/511 |
| 4,384,055 | 5/1983 | Okuda et al. | 524/496 |
| 4,465,615 | 8/1984 | Hata et al. | 252/511 |

*Primary Examiner*—Theodore E. Pertilla
*Attorney, Agent, or Firm*—Sherman Shalloway

[57] ABSTRACT

A vinyl chloride resin composition for production of hard articles. The composition comprises 100 parts by weight of a graft polymer and not more than 40 parts by weight of electrically conductive carbon black. The graft polymer is obtained by polymerizing 99 to 60% by weight of vinyl chloride or a monomeric mixture composed of at least 80% by weight of vinyl chloride and not more than 20% by weight of a monomer copolymerizable with it in the presence of 1 to 40% by weight of a copolymer composed of 5 to 75% by weight of methyl methacrylate and 95 to 25% by weight of ethylene.

6 Claims, No Drawings

VINYL CHLORIDE RESIN COMPOSITION FOR PRODUCTION OF HARD ARTICLES

This invention relates to a vinyl chloride polymer composition comprising a specific vinyl chloride polymer and electrically conductive carbon black. More specifically, this invention relates to a vinyl chloride resin composition for the production of hard articles which has high electric conductivity, excellent processability and excellent additive dispersibility and which gives a shaped article having excellent appearance and mechanical strength and reduced heat deformation and heat shrinkage.

Heretofore, electrically conductive articles have been widely produced commercially by incorporating an electrically conductive material such as electrically conductive carbon or a fine metallic powder in a thermoplastic polymer such as a vinyl chloride polymer, a polyolefin, polystyrene or an ethylene/vinyl acetate copolymer and heat-molding the resulting composition. The electrically conductive articles are widely used as materials for prevention of corona discharge of high-voltage power transmission cables and wires, antistatic packaging materials for IC products, covers for electric precipitators, antistatic sheets, antistatic floor materials, panel heaters for warming floors, other electrical component parts, precision machines and instruments, etc. Among the thermoplastic polymers used in these industrial applications, vinyl chloride resins have occupied an important status because of their ease of fabrication, the versatility of the method of their processing, good properties, relatively low costs, etc. Formulations for the production of soft articles using a homopolymer of vinyl chloride and a vinyl chloride/vinyl acetate copolymer contain a large amount of a plasticizer. Hence, the generation of heat owing to friction during kneading between carbon black particles or between the carbon black particles and the polymer can be reduced to an innegligible degree. The flowability of such a vinyl chloride resin composition is good and no problem in processing arises. Furthermore, the properties of the final product such as strength scarcely give rise to a problem. In the production of hard articles, too, the electrical conductivity required, for example, to prevent static charge buildup is considered sufficient if the composition has a volume resistivity of about $10^7$ ohms-cm. Accordingly, the amount of carbon black blended may be small, and no particular problem arises in the processability of a composition comprising a vinyl chloride polymer or in the properties of the molded articles.

In recent years, however, there has been a stronger demand for hard articles having higher electric conductivity, reduced non-uniformity in conductivity and reduced amounts of heat deformation especially in the field of video discs. The amount of heat deformation may be reduced by making the dispersion of the electrically conductive material as uniform as possible, minimizing the melt viscosity of the composition during molding to avoid molding strains, and at the same time, increasing the heat deformation resistance ($T_g$) of the resin forming the matrix so that the residual strains in the molded articles are difficult to reduce. Generally, however, a vinyl chloride resin having a low melt viscosity has poor mechanical strength and a low heat distortion temperature, and therefore has difficulty in possessing satisfactory flowability, strength and heat deformation resistance at the same time.

We have made investigations in order to develop a vinyl chloride resin composition for production of hard articles, which has a low melt viscosity and shows a very uniform fine dispersion of its constituent components under mild processing conditions that do not destroy the structure of carbon black, and which gives a highly electrically conducting molded article having excellent mechanical strength, a high heat distortion temperature, reduced heat shrinkage and an excellent surface texture. Consequently, we found that this purpose can be achieved by mixing electrically conductive carbon black with a graft polymer obtained by polymerizing vinyl chloride alone or a mixture of vinyl chloride with a monomer copolymerizable with it in the presence of a homopolymer of methyl methacrylate or a copolymer of a major amount of methyl methacrylate and a minor amount of a monomer copolymerizable with it (Japanese Laid-Open Patent Publication No. 164146/1982).

We furthered our investigations and found that the use of a methyl methacrylate/ethylene copolymer as the aforesaid methyl methacrylate-type resin can give a resin composition having flowability, strength and heat distortion resistance in a better-balanced combination than does the use of a homopolymer of methyl methacrylate or a copolymer of methyl methacrylate and another copolymer.

Thus, the present invention provides a vinyl chloride resin composition for production of hard articles, said composition comprising 100 parts by weight of a graft polymer and not more than 40 parts by weight of electrically conductive carbon black, said graft polymer being obtained by polymerizing 99 to 60% by weight of vinyl chloride or a monomeric mixture composed of at least 80% by weight of vinyl chloride and not more than 20% by weight of a monomer copolymerizable with it in the presence of 1 to 40% by weight of a copolymer composed of 5 to 75% by weight of methyl methacrylate and 95 to 25% by weight of ethylene.

The methyl methacrylate/ethylene copolymer constituting the graft polymer used in this invention contains 5 to 75% by weight, preferably 20 to 50% by weight, of methyl methacrylate units. If the proportion of the methyl methacrylate units exceeds 75% by weight, the copolymer has good compatibility with vinyl chloride, but has a reduced effect of improving the impact strength of the resulting composition. On the other hand, if it is less than 5% by weight, the effect of improving impact strength is increased, but the compatibility of the copolymer with vinyl chloride is reduced. The amount of the copolymer of methyl methacrylate and ethylene is 1 to 40% by weight, preferably 2 to 20% by weight, based on the total weight of it and the other component used in the graft polymerization. If it is less than 1% by weight, the effect of improving impact strength is reduced. If it exceeds 40% by weight, the heat shrinkage increases and the surface texture of the molded articles is degraded.

The grafting polymer to be grafted to the methyl methacrylate/ethylene copolymer may be vinyl chloride alone or a mixture of it with another monomer. In the latter, the proportion of the other monomer is generally not more than 20% by weight. Examples of the monomer copolymerizable with vinyl chloride include olefins such as ethylene, propylene and butene; vinyl esters of fatty acids such as vinyl acetate; unsaturated acids such as acrylic acid, methacrylic acid, maleic acid and fumaric acid; unsaturated acid esters such as methyl acrylate and monomethyl maleate; unsaturated acid anhydrides such as maleic anhydride; nitrile compounds such as acrylonitrile; alkyl vinyl ethers such as methyl vinyl ether and cetyl vinyl ether; and vinylidene compounds such as vinylidene chloride.

Preferably, the graft copolymer used in this invention has a specific viscosity (determined in accordance with JIS K-6721) of 0.14 to 0.31. If the graft polymer has a specific viscosity of less than 0.14, it gives a molded article having low strength. If the specific viscosity exceeds 0.31, the resulting composition has a high melt viscosity and poor moldability, and the dispersion of carbon black becomes non-uniform. Hence, specific viscosities outside the specified range are not desirable.

Preferably, the electrically conductive carbon black has an oil absorption (determined by JIS K-6221) of 300 to 400 ml/100 g and a surface area (determined in accordance with ASTM D3037-37) of at least 800 m$^2$/g. If carbon black having an oil absorption of less than 300 ml/100 g or a surface area of less than 800 m$^2$/g is used, a molded article having a low volume inherent resistivity cannot be obtained. When carbon black having an oil absorption of more than 400 ml/100 g is used, the resulting composition has a high melt index and is difficult to process, and the dispersion of carbon black in it tends to become non-uniform. From the standpoint of processability and the strength of the molded article, the carbon black used preferably gives high conductivity in as small amounts as possible. The carbon black is used in an amount of 1 to 40 parts by weight per 100 parts by weight of the graft polymer. The lower limit of the amount of the carbon black is determined according to the volume resistivity required. For example, to obtain a volume resistivity of not more than 500 ohms-cm, the amount of the carbon black should be at least 15 parts by weight. If it is used in an amount exceeding 40 parts by weight, the melt viscosity of the resulting composition is high, and large amount of heat is generated during processing. This is detrimental to the processing of the composition, and molded articles from the composition have poor properties.

As desired, the composition of this invention may include additives for vinyl chloride polymers, such as lubricants, plasticizers, stabilizers, slipping agents etc. The lubricants and plasticizers can each be used in an amount of not more than 5 parts by weight per 100 parts by weight of the graft polymer. If the amount of the lubricants exceeds 5 parts by weight, the softening temperature of molded articles from the resulting composition tends to be lowered. The stabilizers can be used in an amount of not more than 10 parts by weight per 100 parts by weight of the graft polymer. Slipping agents of the silicone type and the fluorine-containing type may be used in an amount of not more than 5 parts by weight per 100 parts by weight of the graft polymer.

Carbon black and various additives may be blended with the graft polymer during processing by an ordinary ribbon blender, a Banbury mixer, a high-speed agitator, etc. Or they may be fed together with the monomer into the polymerization reactor during the production of the graft polymer. Or they may be added to the slurry of the graft polymer before drying.

Since the composition of this invention has very good flowability and molded articles from it have a low volume resistivity and a high softening temperature, it is especially useful for the production of video discs, audio discs, computer discs, etc.

The following examples illustrate the present invention more specifically. All proportions and amounts of the monomers, polymers, carbon black and additives are by weight.

In these examples, the following methods of sample preparation and testing were employed.

Method of preparing a sample

A high-speed agitator was charged with the graft polymer, carbon black, a stabilizer and optionally a lubricant and a plasticizer, and they were thoroughly agitated. The resulting powdery composition was extruded by an extruder kept at 170° C. and molded partly into pellets. The pellets were used as samples for testing the amount of flow and dynamic heat stability. Another portion of the composition was extruded into a rod form having a diameter of 4 mm and a length of 20 mm to form samples for measuring heat shrinkage, and volume resistivity and for observing a surface texture. The remainder was pressed under a pressure of 150 kg/cm$^2$ for 5 minutes by a press kept at 175° C. The volume resistivity, softening temperature and carbon black dispersibility of the resulting press-formed sheets were evaluated.

Amount of flow

The pellets (square-shaped with each side measuring 5 mm) were extruded at a temperature of 180° C. and a load of 250 kg/cm$^2$ by a Koka-type flow tester equipped with a nozzle having a length of 10 mm and a diameter of 1 mm. The amount of flow of the pellets at this time was measured in accordance with the method of testing flow in JIS K-7210. The larger this value, the better the processability of the composition.

Heat shrinkage

The composition was extruded by an extruder into a rod shape having a diameter of 20 mm, and cut to a length of 10 mm to form a tablet. The tablet was placed at the center of a mold having a diameter of 40 mm and a depth of 2 mm, and pressed for 3 minutes at 150° C. After cooling, the pressed product was withdrawn to obtain a disc having a diameter of 40 mm and a thickness of 2 mm. Eight marks (1, 2, 3, . . . 8) were attached to the circumference of the disc at equal intervals, and the distance between the center of the disc and each of the marks ($l_1$, $l_2$, $l_3$ . . . $l_8$) was accurately measured by enlarging it with a shadowgraph. Then, the same sample was heated at 70° C. for 2 hours, and at 23° C., the distance between the center of the disc and each of the marks ($l_1'$, $l_2'$, $l_3'$ . . . $l_8'$) was measured. Based on the data obtained, the percent change of the distance was calculated with respect to each mark. For example, with respect to mark 1, the percent change $\Delta_1$ is calculated in accordance with the following formula.

$$\Delta_1 = \frac{l_1 - l_1'}{l_1} \times 100$$

The arithmetic mean of the percent changes ($\Delta_1$, $\Delta_2$, $\Delta_3$ . . . $\Delta_8$) of the eight distance values was calculated, and defined as the heat shrinkage of the sample.

Softening temperature

Measured in accordance with the method of measuring the softening temperature of a hard vinyl chloride resin plate in accordance with JIS K-6745. An article having a softening temperature of less than 55° C. is undesirable because it undergoes deformation even by a slight change in temperature after molding.

Carbon black dispersibility

A sliced sample, 1 micron thick, was prepared from a press-formed plate by a microtome, and its photograph was taken by a transmission method under an optical microscope at a magnification of 200. The size and number of agglomerated masses of carbon black existing in an area of 200×300 microns were determined, and the dispersed state of carbon black was rated on the scale of A, B and C below.

- A (excellent dispersion): There were not more than 20 agglomerated masses having a maximum width of at least 5 microns, and there was no agglomerated mass having a maximum width of at least 20 microns.
- B (good dispersion): There were not more than 20 agglomerated masses having a maximum width of 5 to 30 microns, and at least one agglomerated mass having a maximum width of at least 20 microns existed.
- C (poor dispersion): More than 20 agglomerated masses having a maximum width of at least 5 microns existed.

Volume resistivity

The aforesaid rod-like extrudate having a diameter of 4 mm was cut to a length of 7.5 cm. Its length was accurately measured by slide calipers, and its diameter was accurately measured by a micrometer. Then, a silver paint was applied to both ends of the sample. The resistance between the two ends of the sample was measured by a tester, and the volume resistivity was calculated from the following formula.

$$\text{Volume resistivity (ohms-cm)} = \text{Resistance (ohms)} \times \frac{\eta \times [\text{diameter (cm)}]^2}{4 \times \text{length (cm)}}$$

Olsen flexural strength

Measured by an Olsen stiffness tester in accordance with ASTM D-747 with a weight of 5 in-lb and a span of ¼ inch. The sample used was a piece (1 cm×3 cm×0.1 cm) cut out from a sheet obtained by pressing pellets (square-shaped with one side measuring 5 mm) by a 75-ton press. A material having a measured stiffness value of less than 5° is undesirable as a hard molded article.

EXAMPLE 1

A 10-liter polymerization kettle was charged with 0.2 part of partially saponified polyvinyl acetate, 1 to 3 parts of trichloroethylene, 0.1 part of a cellulose derivative and 0.4 part of dilauroyl peroxide. They were stirred at room temperature, and degassed. Separately, a closed vessel was charged with a methyl methacrylate-type polymer, a vinyl chloride monomer and optionally another monomer, and they were completely dissolved. The solution was entirely transferred to the polymerization kettle, and the temperature was raised. By this procedure, the polymers shown in Table 1 were obtained. The polymers were separated and dried in a customary manner. The polymer used in comparison e was prepared as above except that a vinyl chloride monomer not containing the methyl methacrylate-type polymer was used.

Compositions were prepared in accordance with the following recipe using these polymers. The properties of these compositions were measured, and the results are shown in Table 1.

| Recipe | |
|---|---|
| Polymer (see Table 1) | 100 (parts) |
| Dioctyltin maleate | 2.5 |
| Dibutyltin dilaurate | 0.5 |
| Epoxidized soybean oil | 0.5 |
| Stearic acid monoglyceride (Lubricant) | 0.5 |
| Ketjen Black EC (a product of Lion-Akzo Company; amount of oil absorption 355 ml/100 g, surface area 1,000 m²/g) | 20 |

TABLE 1

| | | Invention | | | | Comparison | | |
|---|---|---|---|---|---|---|---|---|
| | | a | b | c | d | e | f | g |
| Polymer | | | | | | | | |
| Methyl methacrylate-type polymer | Composition | Methyl methacrylate/ ethylene (20/80) | Methyl methacrylate/ ethylene (30/70) | Methyl methacrylate/ ethylene (40/60) | Methyl methacrylate/ ethylene (70/30) | | Methyl methacrylate | Methyl methacrylate/ styrene (40/60) |
| | Proportion (%) | 5 | 10 | 15 | 15 | — | 10 | 15 |
| Grafting monomer | Composition | Vinyl chloride/ isobutyl vinyl ether (95/5) | Vinyl chloride | Vinyl chloride/ cetyl vinyl ether (95/5) | Vinyl chloride/ cetyl vinyl ether (95/5) | Vinyl chloride | Vinyl chloride | Vinyl chloride/ cetyl vinyl ether (95/5) |
| | Proportion (%) | 95 | 90 | 85 | 85 | 100 | 90 | 85 |
| Specific viscosity (JIS K-6721) | | 0.20 | 0.20 | 0.19 | 0.18 | 0.21 | 0.20 | 0.17 |
| Test Results | | | | | | | | |
| Amount of flow × 10³ (cm³/sec) | | 4.5 | 2.2 | 11.0 | 8.0 | 1.0 | 2.0 | 13.3 |
| Softening temperature (°C.) | | 70.9 | 76.0 | 65.4 | 72.5 | 74.5 | 78.0 | 65.3 |
| Olsen flexural strength (°) | | 16.0 | 18.0 | 18.5 | 14.0 | 10.5 | 10.0 | 8.0 |
| Heat shrinkage (%) | | 0.01 | 0.01 | 0.01 | 0.01 | 0.01 | 0.01 | 0.01 |
| Carbon black dispersibility | | A | A | A | A | C | A | A |
| Volume resistivity (ohms-cm) | | 3.1 | 3.8 | 3.1 | 3.1 | 4.6 | 3.6 | 3.1 |
| Surface texture of the | | Excellent | Excellent | Excellent | Excellent | Poor | Excellent | Good |

TABLE 1-continued

|  | Invention | | | | Comparison | | |
| --- | --- | --- | --- | --- | --- | --- | --- |
|  | a | b | c | d | e | f | g |
| molded article |  |  |  |  |  |  |  |

It is seen from Table 1 that the composition of this invention has excellent properties, and particularly, has markedly improved Olsen flexural strength over comparisons f and g.

EXAMPLE 2

A graft polymer was prepared by grafting 70 parts of a mixture of 95% of vinyl chloride and 5% of cetyl vinyl ether to 30 parts of a 30/70 copolymer of methyl methacrylate and ethylene (invention). Separately, a polymer mixture was prepared by mixing 30 parts of a 30/70 copolymer of methyl methacrylate and ethylene and 70 parts of a 95/5 copolymer of vinyl chloride and cetyl vinyl ether in a high-speed agitator (comparison). The above polymer and polymer mixture had a specific viscosity of 0.18.

Compositions were prepared in the same way as in Example 1 using these polymers, the compositions were tested in the same way as in Example 1, and the results are shown in Table 2.

TABLE 2

|  | Invention | Comparison |
| --- | --- | --- |
| Amount of flow × $10^3$ (cm$^3$/sec) | 10.5 | 10.0 |
| Softening temperature (°C.) | 68.0 | 65.7 |
| Olsen flexural strength (°) | 21.6 | 12.5 |
| Heat shrinkage (%) | 0.23 | 1.22 |
| Carbon black dispersibility | A | B |
| Volume resistivity (ohms-cm) | 3.8 | 3.4 |
| Surface texture of the molded article | Good | Poor |

EXAMPLE 3

Example 1 was repeated except that a graft polymer obtained by grafting 95% of a 5/95 mixture of isobutylene and vinyl chloride to 5% of a 20/80 copolymer of methyl methacrylate and ethylene as in Example 1 was used, and the amount of carbon black was changed as shown in Table 3. The results are shown in Table 3.

|  | Invention | Comparison |
| --- | --- | --- |
| Amount of carbon black (parts) | 30 | 50 |
| Amount of flow × $10^3$ (cm$^3$/sec) | 2.4 | 0.4 |
| Softening temperature (°C.) | 75.6 | 78.0 |
| Olsen flexural strength (°) | 12.7 | less than 5 |
| Heat shrinkage (%) | 0.005 | 0.005 |
| Dispersibility of carbon black | A | C |
| Volume resistivity (ohms-cm) | 1.3 | 1.1 |
| Surface texture of the molded article | Excellent | Poor |

What is claimed is:

1. A vinyl chloride resin composition for production of hard articles, said composition comprising 100 parts by weight of a graft polymer and not more than 40 parts by weight of electrically conductive carbon black, said graft polymer being obtained by polymerizing 99 to 60% by weight of vinyl chloride or a monomeric mixture composed of at least 80% by weight of vinyl chloride and not more than 20% by weight of a monomer copolymerizable with it in the presence of 1 to 40% by weight of a copolymer composed of 5 to 75% by weight of methyl methacrylate and 95 to 25% by weight of ethylene.

2. The composition of claim 1 wherein the monomer copolymerizable with vinyl chloride is at least one compound selected from the group consisting of olefins, unsaturated acids, unsaturated acid esters, unsaturated acid anhydrides, nitrile compounds, alkyl vinyl ethers and vinylidene compounds.

3. The composition of claim 1 wherein the electrically conductive carbon black has an oil absorption, determined by JIS K-6221, of 300 to 400 ml/100 g and a surface area, determined by ASTM D3037-37, of at least 800 m$^2$/g.

4. The composition of claim 1 wherein the copolymer is composed of 20 to 50% by weight of methyl methacrylate.

5. The composition of claim 4 wherein the graft copolymer is obtained by polymerizing the vinyl chloride or monomeric mixture in the presence of 2 to 20% by weight of the copolymer.

6. The composition of claim 1 wherein the graft copolymer is obtained by polymerizing vinyl chloride or the monomeric mixture in the presence of 2 to 20% by weight of the copolymer.

* * * * *